United States Patent [19]
Shimizu et al.

[11] Patent Number: 6,160,590
[45] Date of Patent: Dec. 12, 2000

[54] VIDEO SIGNAL PROCESSING CIRCUIT INHIBITING DISPLAY OF DISTORTED IMAGES

[75] Inventors: Yutaka Shimizu, Takabayashi; Seiya Ota, Ookirida Toshima, both of Japan

[73] Assignee: Sanyo Electric Co., Ltd., Osaka, Japan

[21] Appl. No.: 09/047,712

[22] Filed: Mar. 25, 1998

[30] Foreign Application Priority Data

Mar. 31, 1997 [JP] Japan .................................. 9-081471

[51] Int. Cl.⁷ ............................ H04N 9/74; H04N 5/445
[52] U.S. Cl. ........................................ 348/581; 348/567
[58] Field of Search ................................... 348/561, 562, 348/568, 567, 581, 582; H04N 5/445, 9/74

[56] References Cited

U.S. PATENT DOCUMENTS 5,963,221  10/1999  Shimizu et al. ...................... 348/581
6,008,854  12/1999  Shimizu .............................. 348/581

FOREIGN PATENT DOCUMENTS 9116827  5/1997  Japan .

*Primary Examiner*—Sherrie Hsia
*Attorney, Agent, or Firm*—Hogan & Hartson, LLP

[57] ABSTRACT

A video signal processing circuit uses a buffer memory for reducing or expanding video signals in the generation of child images to be displayed within a display window. Image size data, stored in a header within the buffer memory, and a reduced video signal are prevented from representing different image reduction ratios which might otherwise occur when the reduction ratio is changed. At the time of changing the reduction ratio, image size data SIZ are calculated from a write enable signal based on reduction ratio data K, for a one-field period just after the change by an input video clock generator 22. The calculated image size data are written to a header together with a reduced video signal in a field memory 2, and a flag bit SP indicating the change in the reduction ratio is also written to the header for the one-field period just after the change. When data are read from the buffer memory, the flag bit SP is detected by a display video clock generator 23 to mute a video signal output when there is a likelihood of displaying distorted data. On the other hand, writing to the field memory 2 is inhibited for the one-field period just after the change in the image magnification data so that the muting period of the video signal output can be shortened.

16 Claims, 12 Drawing Sheets

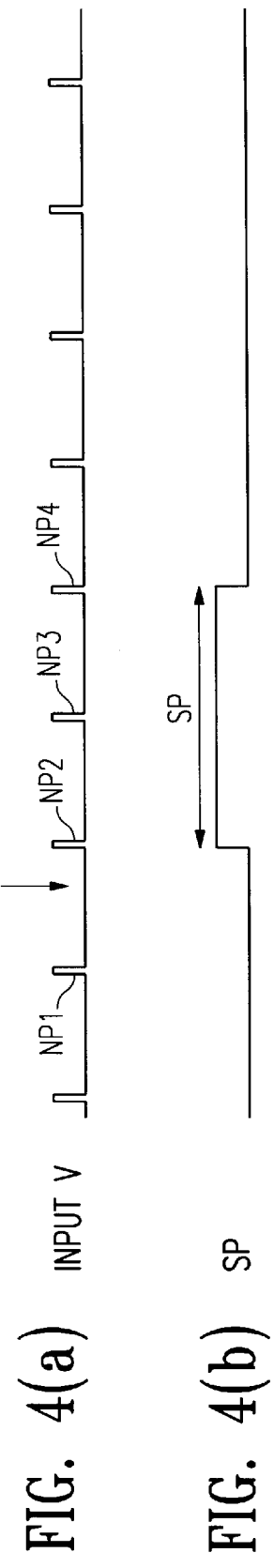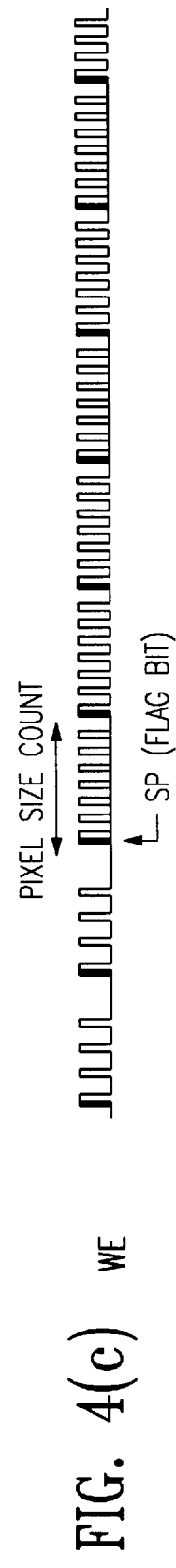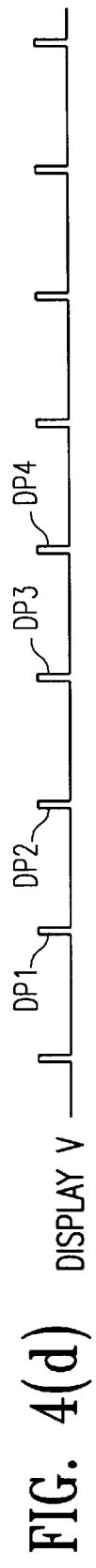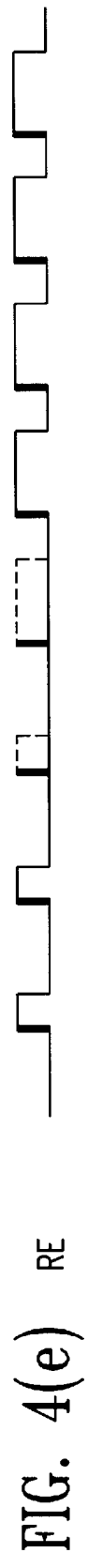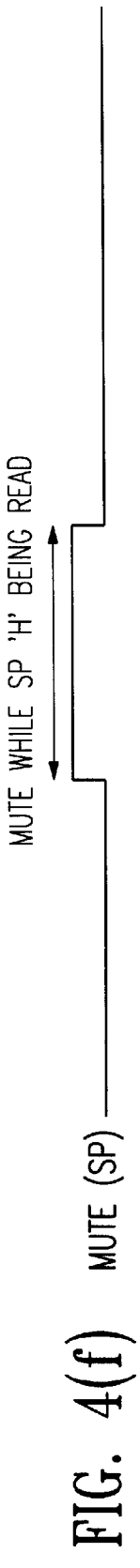

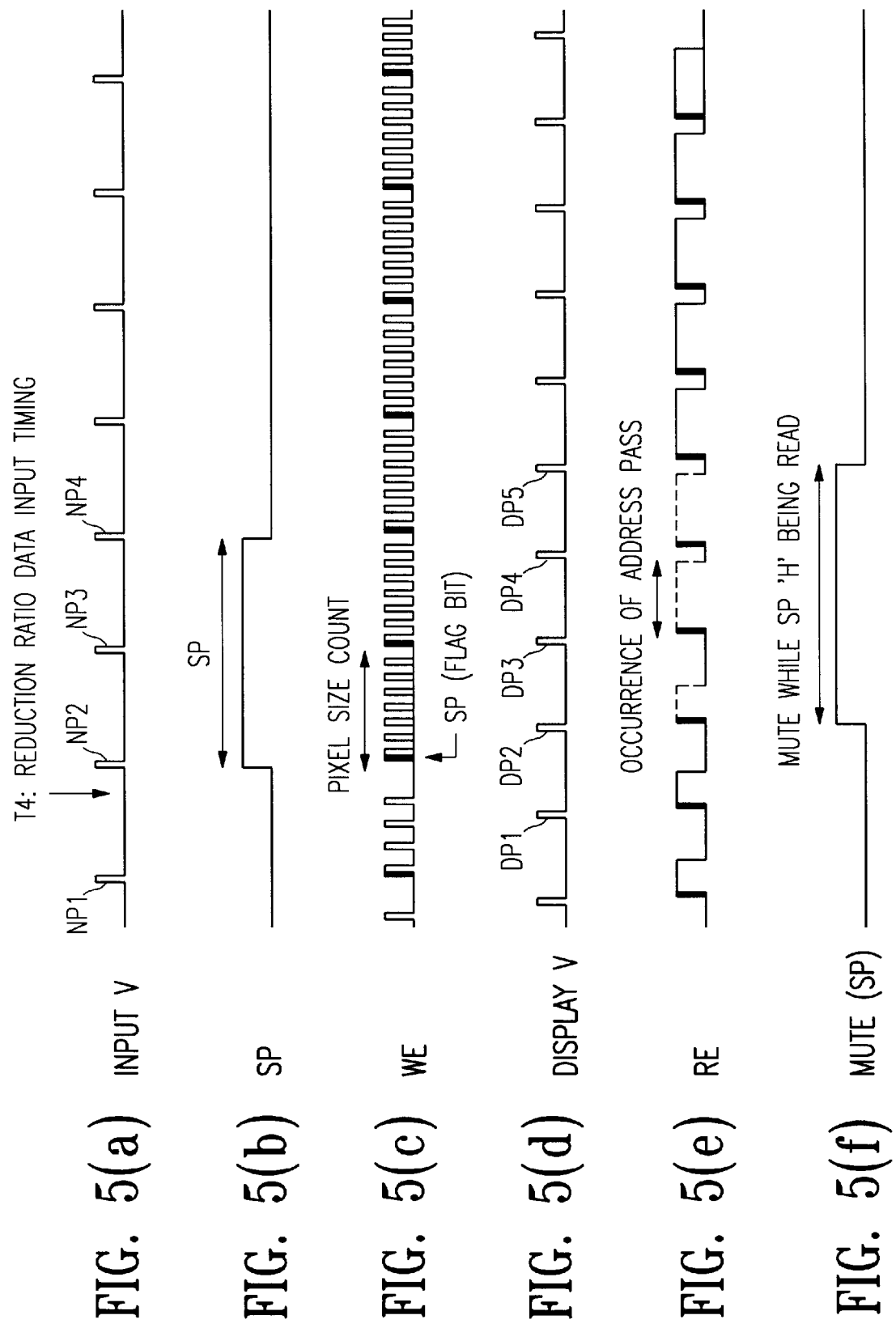

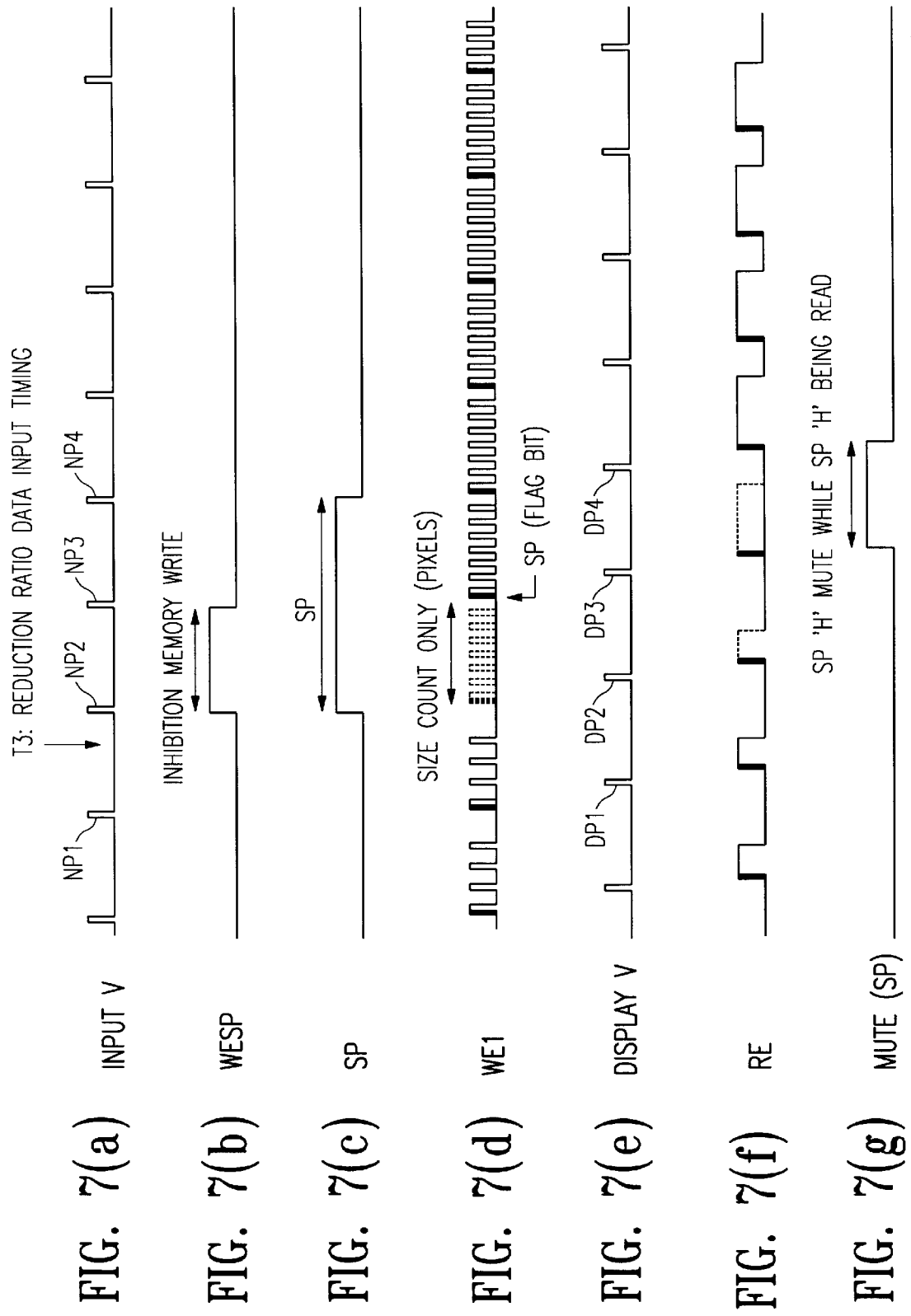

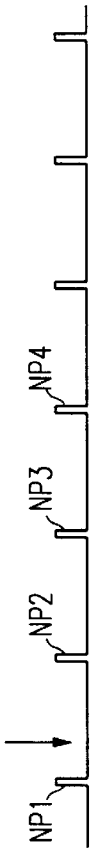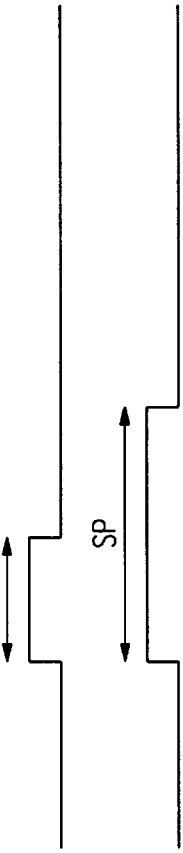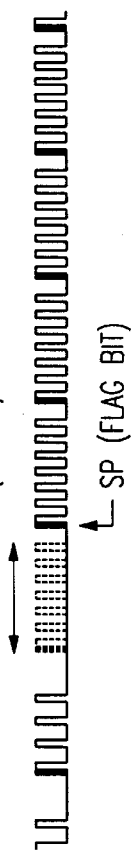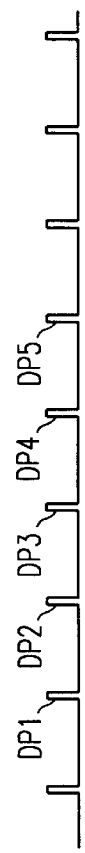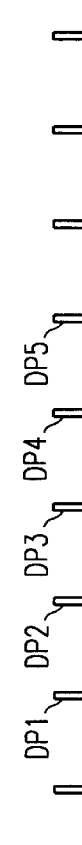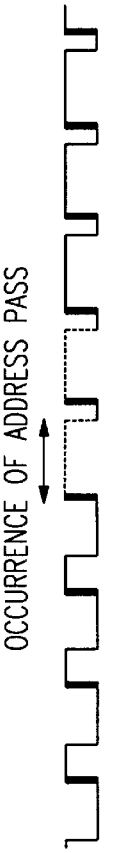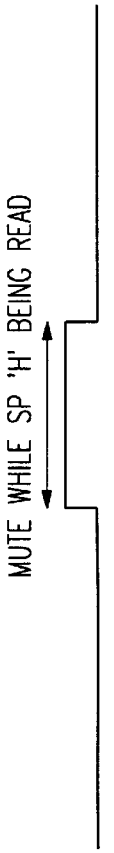
FIG. 8(a) INPUT V
FIG. 8(b) WESP
FIG. 8(c) SP
FIG. 8(d) WE1
FIG. 8(e) DISPLAY V
FIG. 8(f) RE1
FIG. 8(g) MUTE (SP)

FIG. 10(a) PRIOR ART INPUT V
FIG. 10(b) PRIOR ART WE1
FIG. 10(c) PRIOR ART VE2
FIG. 10(d) PRIOR ART DISPLAY V
FIG. 10(e) PRIOR ART RE1
FIG. 10(f) PRIOR ART RE2

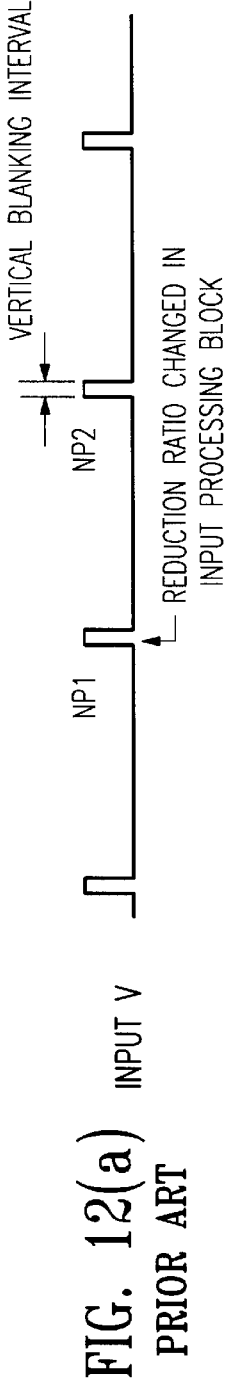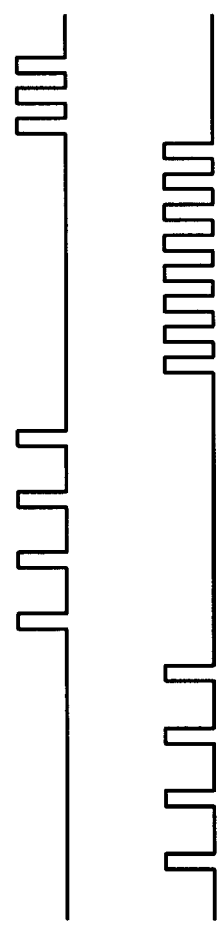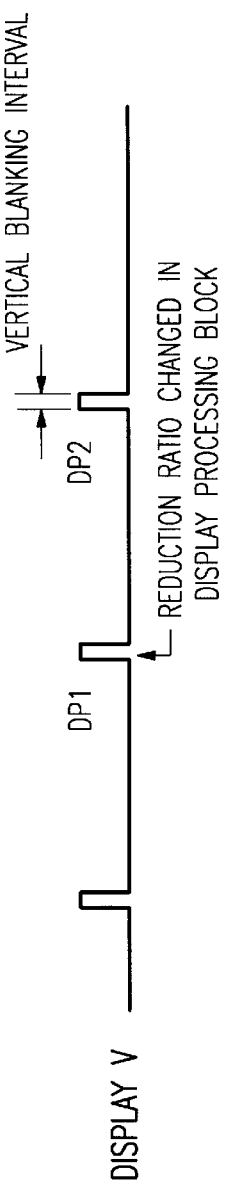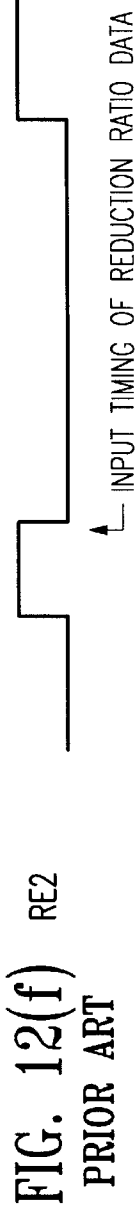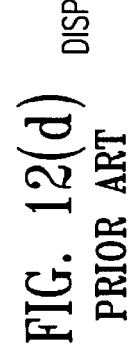
FIG. 12(a) PRIOR ART
FIG. 12(b) PRIOR ART
FIG. 12(c) PRIOR ART
FIG. 12(d) PRIOR ART
FIG. 12(e) PRIOR ART
FIG. 12(f) PRIOR ART

VIDEO SIGNAL PROCESSING CIRCUIT INHIBITING DISPLAY OF DISTORTED IMAGES

BACKGROUND OF THE INVENTION

1. Field of the Invention

Certain embodiments of the present invention relate to a video signal processing circuit for processing an input video signal to display reduced or enlarged video images within a display window, where the video signal processing circuit uses a buffer memory such as a field memory or a frame memory as a functional component of the video processing circuit. Other embodiments of the present invention relate to a video signal processing circuit capable of changing the magnification of a video image by applying a reduction ratio or a magnification ratio.

2. Description of the Related Art

Television displays presently provide a variety of display functions, including the well known "picture in picture (PIP) function" that allows the selective display of either a single video image covering the whole display window or a plurality of video images simultaneously displayed within the window of the display. With the introduction of multimedia applications for television displays, there is an increasing demand that television displays provide additional display functions. A particularly demanded function for television displays used in multimedia applications is the "window display function at an arbitrary reduction ratio," widely implemented as part of the operating environments of personal computers. Using an arbitrary reduction ratio to generate a child frame is difficult for most simple implementations of video processing circuits.

The display of multiple frames or images within a television display window requires that a video signal processing circuit include a buffer memory such as a field memory or a frame memory so that the display of the parent frame can be synchronized with display of the one or more child frames within the window. FIG. 9 shows a block diagram of a conventional video signal processing circuit that may be used for generating a reduced image for display in a child frame. The FIG. 9 circuit performs time based compression of a video signal to reduce the size of an image. Input processor 1 receives an input video signal corresponding to an image to be displayed in a child frame within the window of the display. The input processor 1 processes the input video signal according to a value of the reduction ratio K to generate a reduced video signal that is sized to fit within the child frame. Within the input processor, the reduction processing is performed with an internal filter circuit 10. The reduced video signal output from the filter is written into the field memories 2 and 3. Control block 4 provides an input video clock generator 5 that controls the writing of signals to the field memories 2 and 3, and a display video clock generator 6 that controls the reading of signals from the field memories 2 and 3. By using independent clocks for writing and reading signals from the field memories, it is possible to write and read the signals at different clock speeds, facilitating signal reduction (compression) or magnification (expansion). The reduction ratio data K are provided from a source external to the input video clock generator 5, which then provides the reduction ratio K to the input processor 1.

Input video clock generator 5 receives a horizontal synchronizing signal (or an input H) and a vertical synchronizing signal (or an input V). Input video clock generator 5 generates and outputs a write clock WCLK having the same rate as a pixel clock synchronized with the input H. The input video clock generator 5 also outputs write enable signals WE1 and WE2 for alternately enabling the field memories 2 and 3, switching between the field memories at a field display rate appropriate to effectively display the input video signal. Additionally, the input video clock generator outputs a write reset signal WRST for resetting the write addresses of the field memories 2 and 3 at the rise of the write enable signals. Field memories 2 and 3 are individually equipped with address counters for independently designating the write and read addresses for write and read operations so that video signal streams can be written to memories without external address generation. The write address counter within each of the field memories is reset by the signal WRST and generates write addresses by incrementing the write address counter in response to each of the write clocks WCLK issued while the enable signals WE1 and WE2 are at an H level. Consequently, the reduced video signal provided by the input processor 1 is written into the field memories 2 and 3.

Processing of the video signal to reduce an image may include selectively omitting pixels from the stream of pixels within the original video signal to produce the reduced video signal corresponding to the smaller child frame image. Pixels are omitted by controlling the write enable signals to prevent selected pixels from being stored in the memory. When the value of the reduction ratio K is "1," i e., when no reduction of the video image is to be performed, the write enable signals WE1 and WE2 are kept at the H level for the effective video period. When the value of the reduction ratio K is lower than "1," the H-level periods of the enable signals WE1 and WE2 are controlled according to the value of the reduction ratio K. If the value of the reduction ratio K is "½," for example, the enable signals WE1 and WE2 are cycled between the H level and the L level at every other pixel, as shown at (b) and (c) in FIG. 10. Input video clock generator 5 also calculates image size data SIZ appropriate to the child frame on the basis of the value of the reduction ratio K and transmits the data SIZ to the display video clock generator 6. If the number of horizontal pixels and the number of vertical pixels of the input video signal are "640" and "480," respectively, and if the value of the reduction ratio K is "½", for example, the image size data SIZ are "320" and "240," respectively, for the horizontal SIZ(H) and the vertical SIZ(V). Thus, 240 lines of video signal with each line including 320 pixels will be stored in the field memories when the child image is displayed in a frame having X and Y dimensions reduced in length to one half of the dimensions of the display window.

To read the reduced video signals from the field memories, on the other hand, the display video clock generator 6 receives both the horizontal synchronizing signal (or the display H) and the vertical synchronizing signal (or the display V) of the display video signals or of the parent frame. The display video clock generator 6 also receives the display position data (X, Y) indicating the display position of the reduced child frame within the window. Display video clock generator 6 outputs a read clock RCLK having the same rate as a pixel clock synchronized with the display H. Display video clock generator 6 outputs read enable signals RE1 and RE2 that alternately enable the field memories 2 and 3, switching between the field memories at a field display rate appropriate for the effective display of the display video signals. Display video clock generator 6 also outputs a read reset signal RRST for resetting the read addresses of the field memories 2 and 3 at the rise of the read enable signals. Following the reset at the beginning of data reading, the reading address counters in the field memories 2 and 3 generate successive read addresses by incrementing the read address for each cycle of the read clock RCLK that occurs while the enable signals RE1 and RE2 are at the H level. Successive addresses are thus addressed and the reduced video signals are read out from the field memories 2 and 3. Here, the display H and the display V may be generated, if known in advance, by the display video clock generator 6 so that the various signals RRST, RCLK, RE1 and RE2 may be generated on the basis of the display H and display V signal.

FIG. 11 illustrates a conventional picture-in-picture television display with a child frame image A displayed on the window. As shown, the display position data (X, Y) indicates the display position of the child frame on the parent frame for the displayed video signal, and image size data SIZ (H, V) indicate the size of the child image and frame of the input video signals to be next displayed in the window. On the basis of the image size data SIZ (H, V) and the image position data (X, Y), the display video clock generator 6 sets the aforementioned read enable signals RE1 and RE2, as shown at (e) and (f) in FIG. 10, to the H level only for the effective display period so that the display of FIG. 11 may be realized. In this case, the H level is continuously outputted, in contrast to the selective write enable used when writing data into the field memories 2, 3. Moreover, the image size data SIZ and the image position data (X, Y) are transmitted from the display video clock generator 6 to a display processor 7 located downstream of the field memories 2 and 3. Display processor 7 performs display processing for the window display, such as framing the reduced video signals read out from the field memories or adding background data to be displayed with the video image, and the result from the display processor is outputted as display video signals.

In order to change the reduction ratio arbitrarily, as would be required for the display of child images in an arbitrarily sized child frame, the processing content has to be changed at both the input side and the display side of signal processing circuit in accordance with the newly input reduction ratio data. In other words, new video signals processed according to the new reduction ratio data must be input to the field memories 2, 3 from the input side, and new SIZ and image position data (X, Y) must be provided to the display processor 7 on the display side before a new image according to the new reduction ratio data can be displayed. However, the presently displayed image is disturbed if the processing content is changed during the actual writing and reading actions. In order to prevent this disturbance, the change in the reduction ratio is performed during the vertical blanking interval. Since the input V and the display V are not synchronized, however, the change in the reduction ratio has a time distortion between the write side and the read side. If a new reduction ratio K is input at time T1 when the phase of the display V is delayed from the input V, as shown at (a) and (d) in FIG. 10, the reduction ratio is changed at the input video clock generator 5 and the input processor 1 during a vertical blanking interval NP1 just after T1, and subsequent reduction and write control operations are performed according to the changed reduction ratio. In the display video clock generator 6 and the display processor 7, however, the reduction ratio is changed for a vertical blanking interval DP1 just after T1. The timing of the change of the processing content on the display side comes after the changing time NP1 at the input side so that the video signals, as written according to the changed reduction ratio, are subjected to the display processing on and after DP1.

If, on the other hand, the new reduction ratio data are input at time T2 after the vertical blanking interval NP1 for the input V and before the vertical blanking interval DP1 for the display V, as shown in FIG. 12, the reduction ratio is changed in the input video clock generator 5 and the input processor 1 for the vertical blanking interval NP2 after T2. In the display video clock generator 6 and the display processor 7, the change in the reduction ratio is performed during the vertical blanking interval DP1 before NP2, prior to the change in the reduction ratio at the input side. For the display period after the change (DP1) in the reduction ratio, therefore, the video signals before the change in the reduction ratio are to be displayed, thereby seriously distorting the image displayed in the child frame. This raises a problem that the reduction ratio cannot be changed if the child frame is to be continuously displayed.

In Japanese Patent Application No. 7-267107, therefore, we have proposed a reduced video signal processing circuit for controlling the reading of a reduced video signal, if the reduction ratio is changed, on the basis of image size data based on the changed reduction ratio. The described system accomplishes this function by writing the image size data within a header associated with the reduced video signals stored in a buffer memory so that the image size data can be read at the display side particularly corresponds to the reduced video signal. According to this construction, after the image size data are fixed, the display can be reliably processed at the display side using the new reduction ratio associated with the video signals for which the reduction ratio has been changed. However, the image size data stored in the header are determined by counting the horizontal write enable signal WEH and the vertical write enable signal WEV used in generating the write enable signals WE1 and WE2, respectively, for one horizontal period of the input H and for a one-field period of the input V. For the one-field period just after the change in the reduction ratio, therefore, the video signal is necessarily that which is processed at the new reduction ratio, but the image size data cannot immediately be adjusted for the data after the change in the reduction ratio, so that the reduction ratios are different between the reduced video signal to be written in the buffer memory and the image size data in the header associated with that reduced video signal.

If an address passing phenomenon occurs between the write address and the read address for the buffer memory, on the other hand, the reduction ratios become unequal between the image size data added as the header and the accompanying reduced image signals. This may result in display of a distorted image.

The problems thus far described may occur not only in a reducing process but may also occur in an enlarging process.

SUMMARY OF THE PREFERRED EMBODIMENTS

According to an aspect of the present invention, a video signal processing circuit includes an input processor for reducing or enlarging an input video signal in accordance with image magnification data. A buffer memory stores the reduced or enlarged video signal. A write control unit controls writing to the buffer memory by generating a write control signal in accordance with the image magnification data. Most preferably, the write control unit includes a calculation circuit for calculating image size data after a change in the image magnification data. The display control unit writes the calculated image size data as a header together with the reduced or enlarged video signal within the buffer memory. The display control unit also writes a flag bit indicating the change in the image magnification data in the header for a predetermined period after the change in the image magnification data, said display control unit controlling reading of video signals from said buffer memory in accordance with said image size data and muting a video output for a constant period of time after detecting the flag bit.

In accordance with a more detailed aspect of the invention, the write control unit further includes an inhibition circuit for inhibiting writing to the buffer memory at least for the calculation period in the calculation circuit.

In accordance with a different more detailed aspect of the invention, the predetermined period is two vertical periods whereas the constant period is one vertical period.

According to a different more general aspect of the present invention, a video signal processing circuit includes an input processor for reducing or enlarging an input video signal in accordance with image magnification data. A buffer memory stores the reduced or enlarged video signal. A write control unit controls writing to the buffer memory by generating a write control signal in accordance with the image magnification data. Most preferably, the write control unit includes a calculation circuit for calculating image size data after a change in the image magnification data and a display control unit for writing a header to the buffer memory corresponding to the change in the image magnification data. Preferably, the header includes a flag to indicate that a change in the image magnification data has occurred. The flag causes the display control unit to prevent output of a video signal when at least one display condition is consistent with a value of the image magnification data before the change in the image magnification data.

BRIEF DESCRIPTION OF THE DRAWINGS

FIG. 4 is a timing chart for illustrating operation of the first embodiment;

FIG. 5 is a timing chart for illustrating actions of the case in which an address pass occurs in the embodiment of FIG. 1;

FIG. 7 is a timing chart for illustrating operation of the second embodiment;

FIG. 8 is a timing chart for illustrating the actions of the case in which an address pass occurs in the second embodiment;

FIG. 12 is a timing chart for explaining other actions of the reduced video signal processing circuit.

DETAILED DESCRIPTION OF THE PREFERRED EMBODIMENTS

Preferred embodiments of the present invention avoid display of distorted video images in a system capable of generating child images for display within a display window. Most preferably, this is accomplished in a manner that allows for continuous display of the image within the child frame. According to particularly preferred embodiments, a video signal processing circuit uses a buffer memory for reducing or expanding video signals in the generation of child images to be displayed within a display window. Image size data, stored in a header within the buffer memory, and a reduced video signal are prevented from representing different image reduction ratios which might otherwise occur when the reduction ratio is changed. At the time of changing the reduction ratio, image size data SIZ are calculated from a write enable signal based on reduction ratio data K, for a one-field period just after the change by an input video clock generator 22. The calculated image size data are written to a header together with a reduced video signal in a field memory 2, and a flag bit SP indicating the change in the reduction ratio is also written to the header for the one-field period just after the change. When data are read from the buffer memory, the flag bit SP is detected by a display video clock generator 23 to mute a video signal output when there is a likelihood of displaying distorted data. Most preferably, writing to the field memory 2 is inhibited for the one-field period just after the change in the image magnification data so that the muting period of the video signal output can be shortened.

Figure 1:
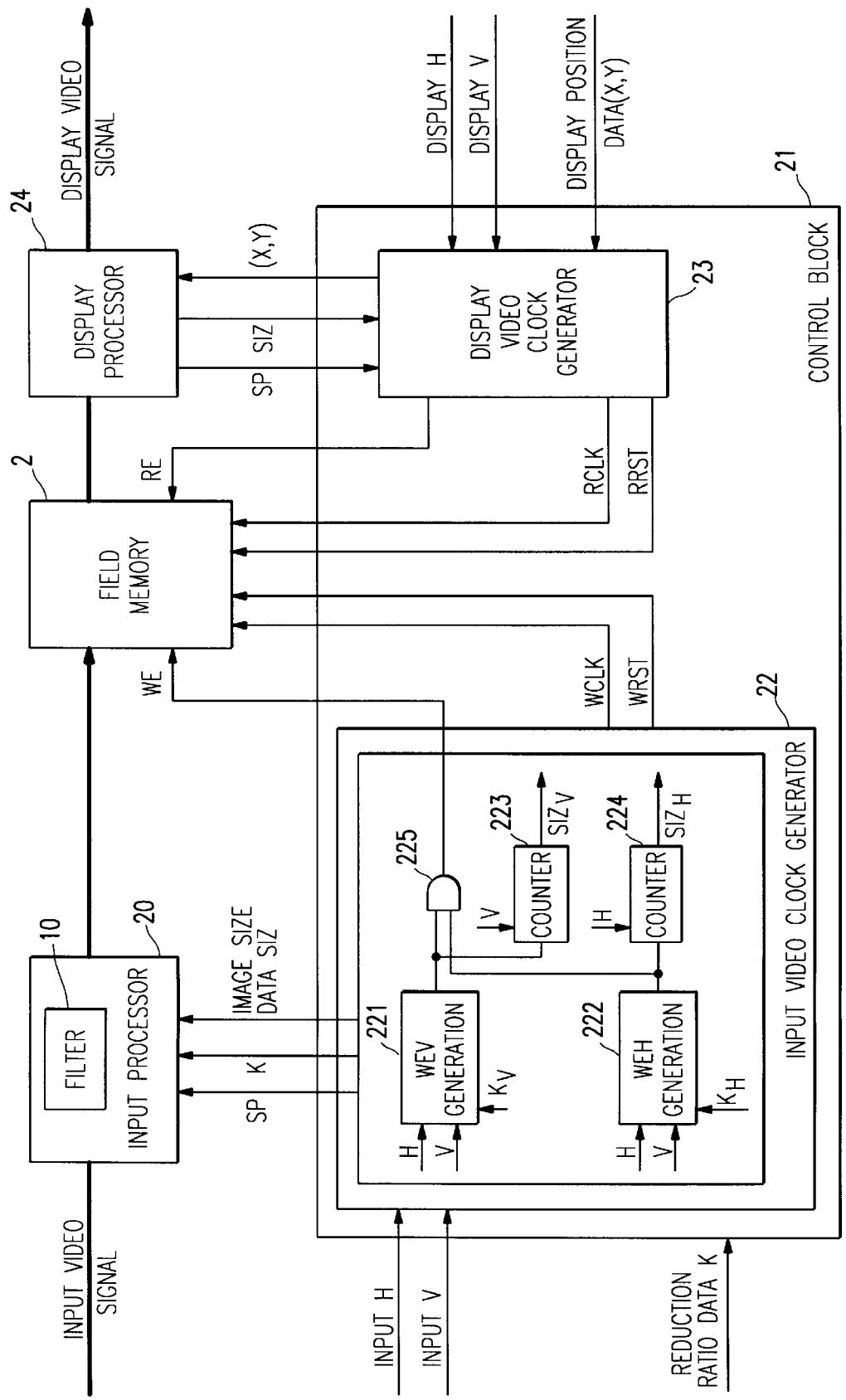
FIG. 1 is a block diagram showing a first embodiment of the invention.
Figure 9:
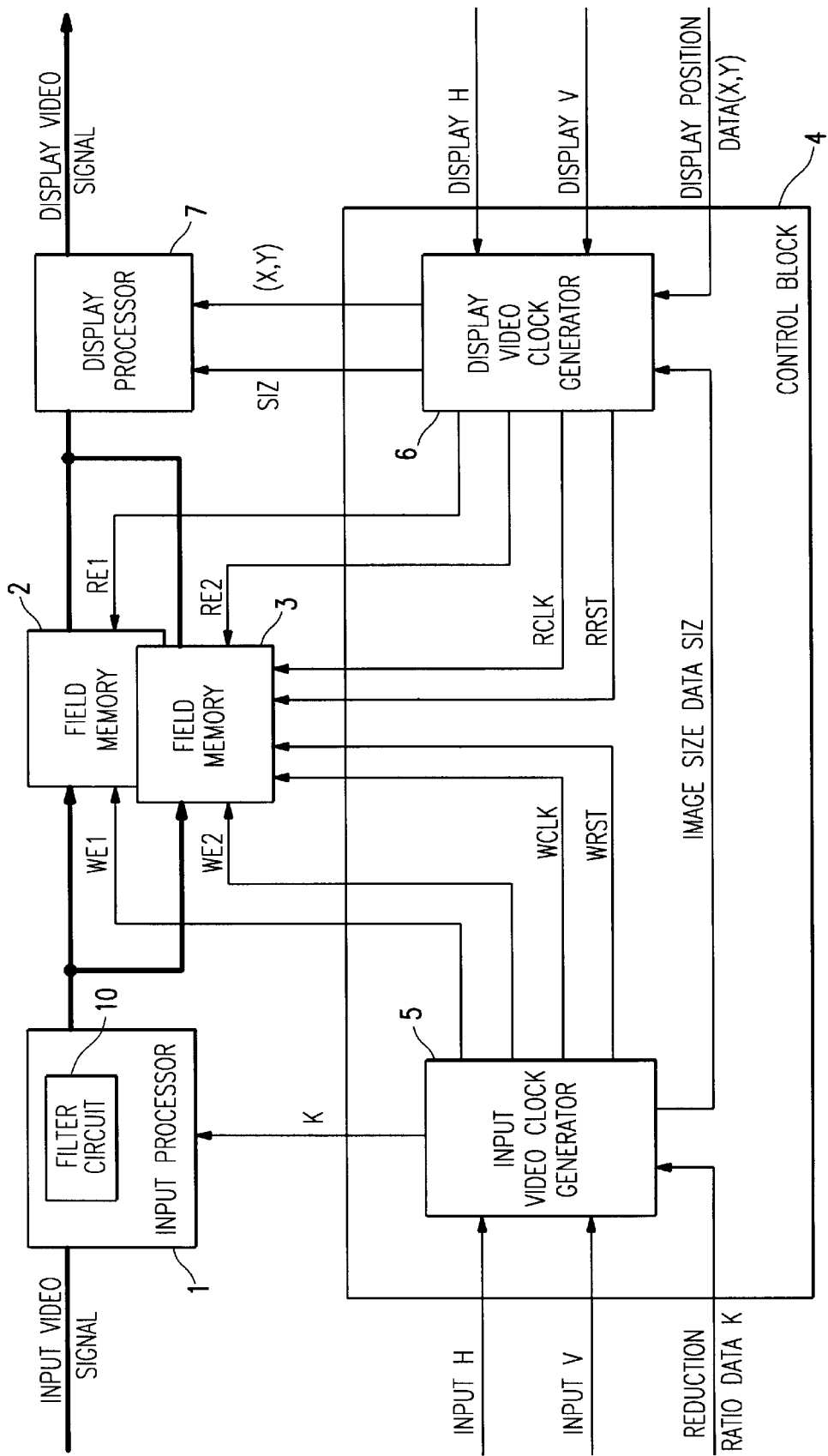
FIG. 9 is a block diagram showing a conventional reduced video signal processing circuit.
Figure 10:
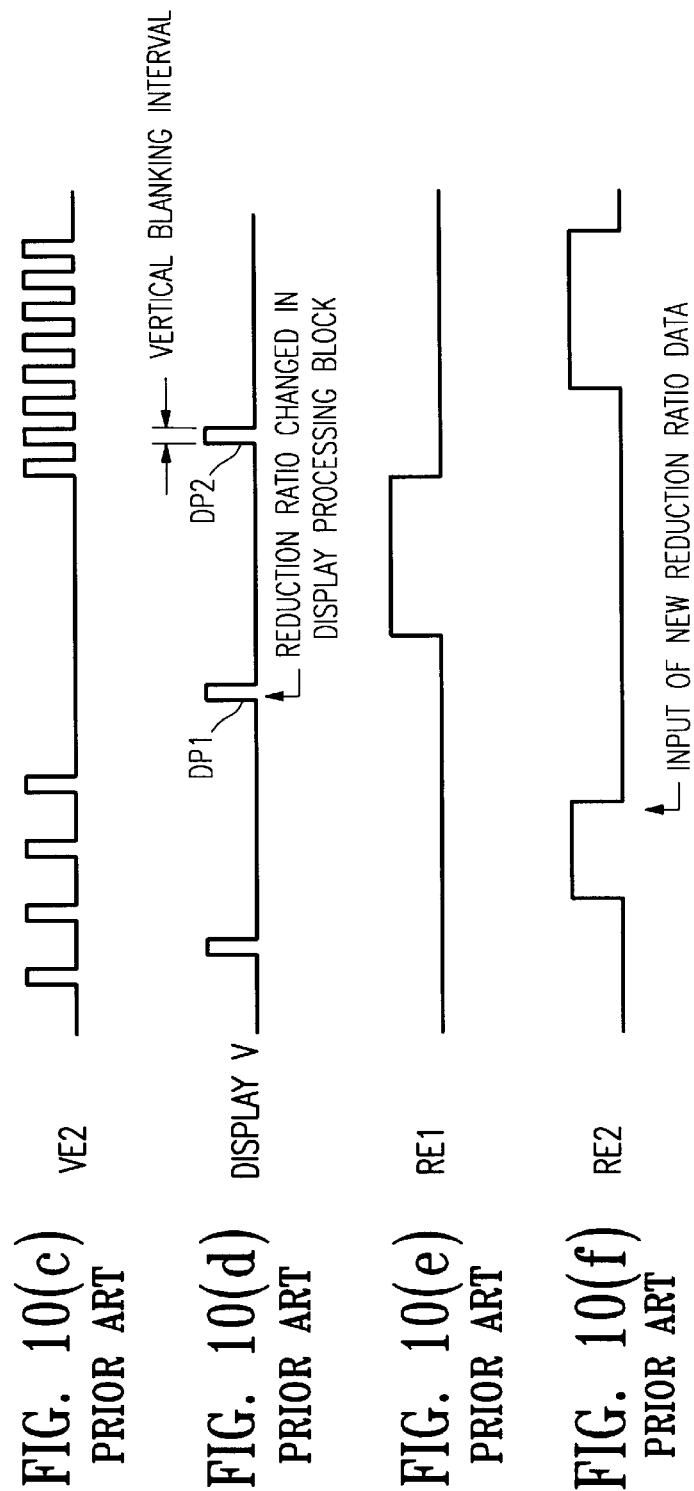
FIG. 10 is a timing chart for illustrating operation of the reduced video signal processing circuit.
Figure 11:
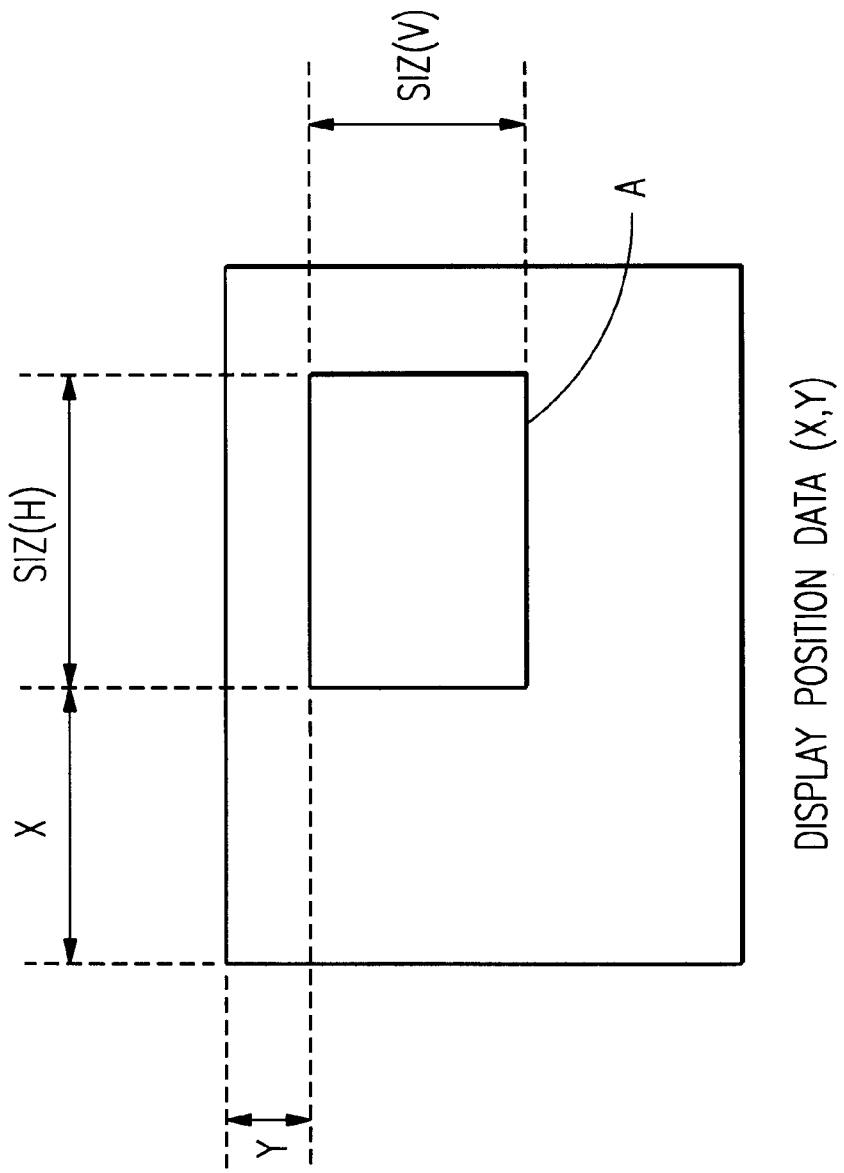
FIG. 11 is a diagram showing an example of a conventional window display.

FIG. 1 is a block diagram showing a first embodiment of the invention. Reference numerals 20, 21, 22, 23 and 24 of FIG. 1 generally correspond to the input processor 1, the control block 4, the input video clock generator 5, the display video clock generator 6 and the display processor 7, respectively, of the conventional display system shown in FIG. 9. Interrelations of the components illustrated in FIG. 1 are generally similar to those illustrated in FIG. 9 and discussed above with respect to FIG. 9. The FIG. 1 embodiment uses different and additional functionality for certain of these subsystems to achieve one or more of the advantages of the present invention. In particular, the input video clock generator incorporates particularly preferred structures for accomplishing certain particularly preferred functions of a video signal processing system in accordance with the present invention. Additionally, the embodiment of FIG. 1 differs from the FIG. 9 system in that the FIG. 1 embodiment uses a single field memory 2 as a field memory and may naturally adopt a frame memory to replace the field memory.

Input video clock generator 22 includes a WEV generator 221, responsive to the vertical reduction ratio data KV portion of reduction ratio data K, which generates a vertical write enable signal WEV that takes an H level during a one-field period for those video signal lines that are to be written into the memory 2. The input video clock generator 22 also includes a WEH generator 222, responsive to horizontal reduction ratio data KH, which generates a horizontal write enable signal WEH that takes the H level only at pixels to be written into the memory 2 for one horizontal period. Two counters, 223, 224 connected to corresponding H and V write enable signal generator circuits, are also provided within the input video clock generator 22. Counter 223 operates following a reset signal from an input V to calculate vertical image size data SIZ(V) by counting cycles of the vertical write enable signal WEV. Counter 224 operates following a reset signal from an input H to calculate horizontal image size data SIZ(H) by counting cycles of the horizontal write enable signal WEH. AND gate 225 receives write enable signals WEV and WEH and outputs an enable signal WE in response to the write enable signals.

The timing chart of FIG. 4 illustrates comparative timings of signals within the FIG. 1 embodiment, when no address pass is caused by the write and read of the field memory 2.

When new reduction ratio data K are input at time T3, as shown in FIG. 4, the input video clock generator 22 and the input processor 20 change the reduction ratio according to the new reduction ratio data K during a vertical blanking interval NP2 just after T3, as shown at (a) in FIG. 4. Subsequent video signal reduction and write control operations are executed according to the changed reduction ratio. In the input video clock generator 22, for example, the WEV generator 221 and the WEH generator 222 generate new write enable signals WEV and WEH, respectively, according to the changed reduction ratio. Similarly, the counters 223 and 224 calculate new image size data SIZ(V) and SIZ(H), respectively, by counting the write enable signals WEV and WEH for a one-field period between NP2 (the first vertical blanking interval following receipt of new reduction ratio data K) and the next vertical blanking NP3. For a two-field period extending from NP2 to NP4, a flag bit SP indicates that there has been a change in the reduction ratio, for example, by the flag bit SP taking the H level, as shown at (b) in FIG. 4.

Figure 2:
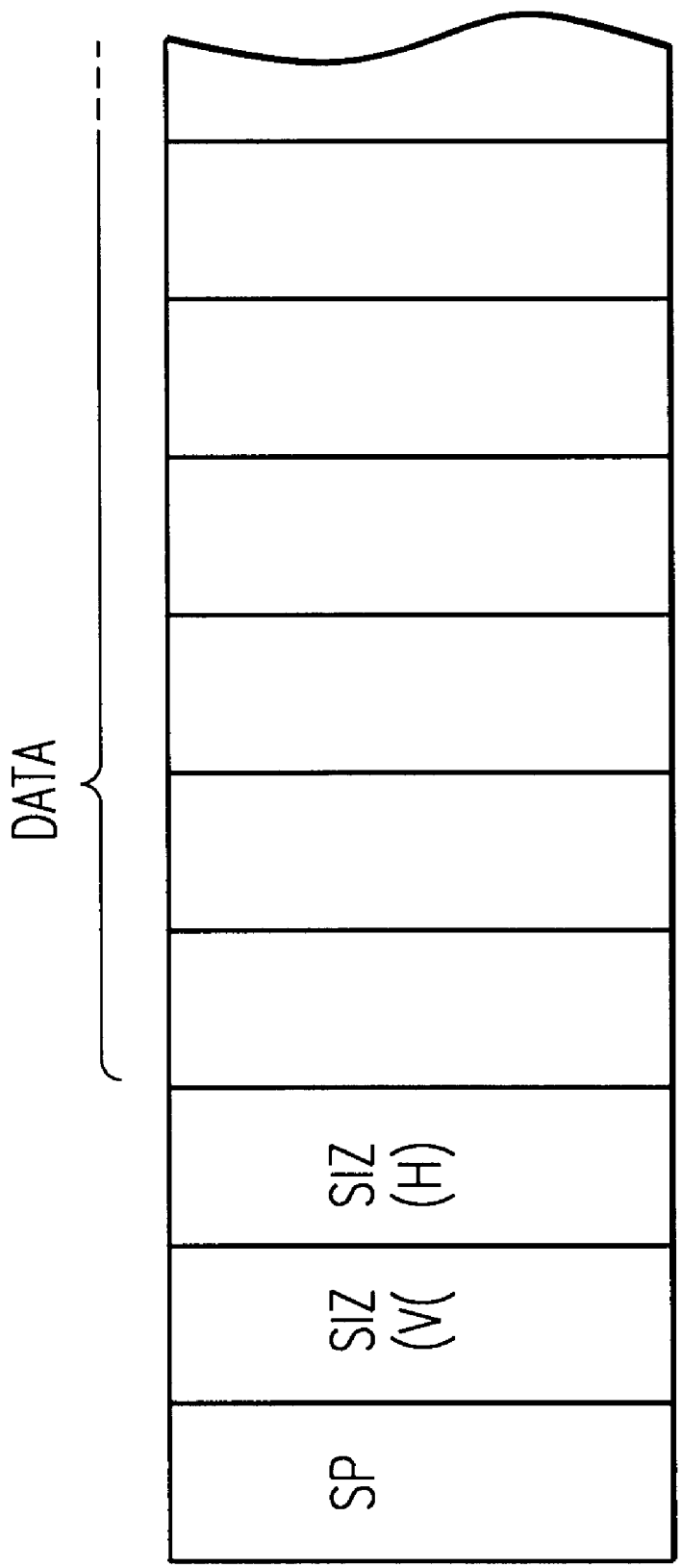
FIG. 2 is an explanatory diagram showing a data format to be written in a field memory.

During the one-field period just after NP2, the input video clock generator 22 outputs the image size data SIZ and the flag bit SP to the input processor 20 and the input video clock generator outputs the write enable signal WE to the field memory 2, as shown in FIG. 1 and at (c) in FIG. 4. As shown in FIG. 2, therefore, the flag bit SP and the image size data SIZ are written to a header in the field memory 2, and the reduced video signal, as reduced in the input processor 20 on the basis of the changed reduction ratio data K, is subsequently written into the field memory 2. At this time, however, the image size data SIZ for the changed reduction ratio are not calculated yet so that the image size data initially written into the header within the memory 2 are the image size data before the change in the reduction ratio data K. Consequently, the initially written image size data represents a reduction ratio different to that of the subsequently written reduced video signal.

Flag bit SP written for the new reduction ratio data K is read out from the field memory 2 for a one-field period following vertical blanking interval DP2 in response to a read enable signal RE, as shown at (e) in FIG. 4 from the display video clock generator 23. The read out value of the flag bit SP is provided through the display processor 24 to the display video clock generator 23. In response to the flag bit SP, the video clock generator 23 lowers the subsequent occurrence of the read enable signal RE to an L level so that the image size data and the video signal from the field memory 2 are not read out in that subsequent interval. As a result, the video signal output having an unequal reduction ratio is muted. As used in this discussion and as used in defining the present invention, the term muted refers to a process whereby video data output is suspended or delayed in a manner that allows preferred embodiments of the present invention to avoid display of distorted images.

Figure 3:
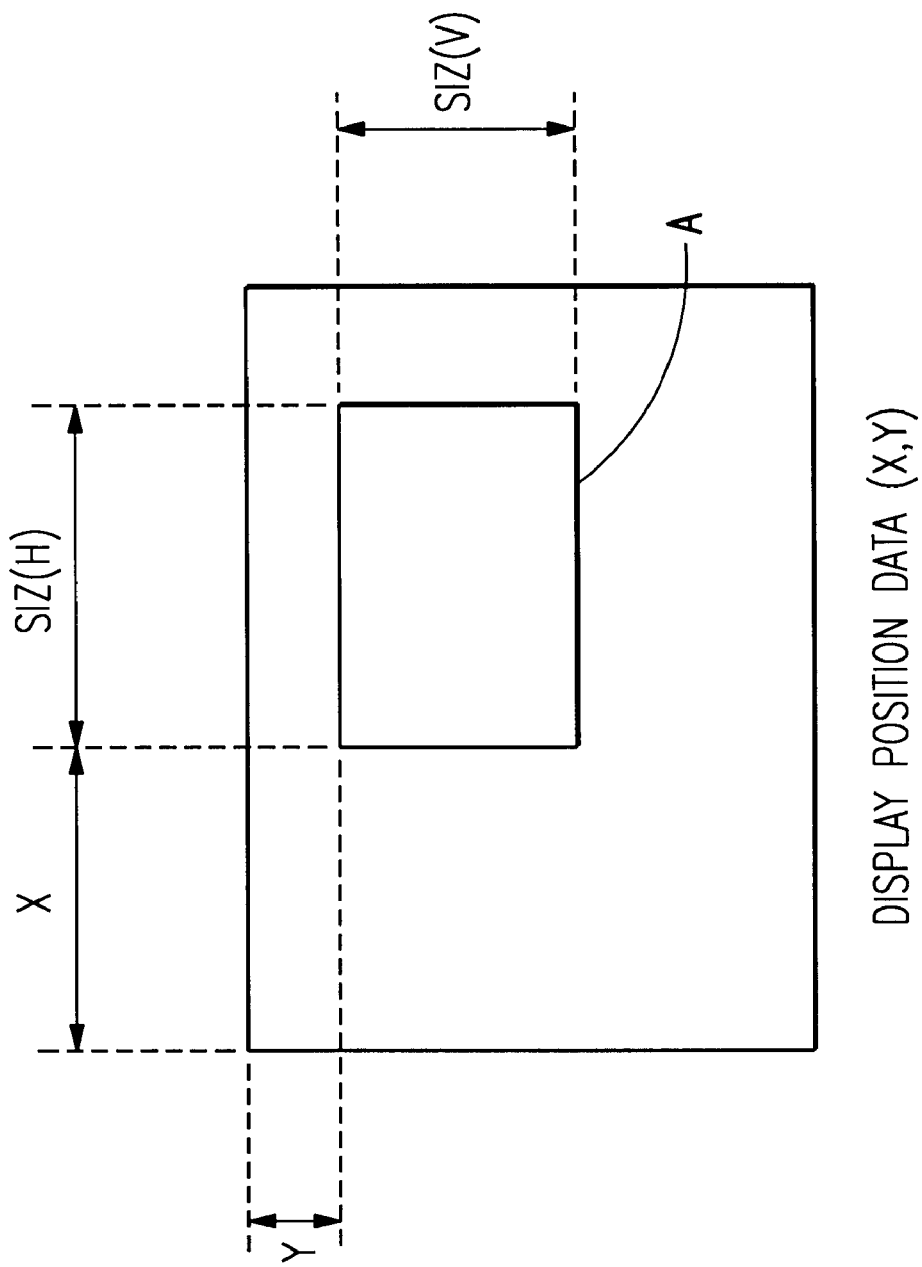
FIG. 3 is a diagram showing an example of a window display.

Because the flag bit SP is held at the H level for the additional one-field period following the next vertical blanking interval NP3, the input video clock generator 22 transmits the image size data SIZ, now properly corresponding to the most recently received (new) reduction ratio data K, and the flag bit SP to the input processor 20 and outputs the write enable signal WE to the memory 2, as shown at (c) in FIG. 4. As a result, the proper image size data SIZ, corresponding to the reduction ratio data K used in generating the reduced video signal, and the flag bit SP are written to the header in the field memory 2, and the reduced video signal, as based on the changed reduction ratio data K, is then written in the field memory 2. Since the image size data SIZ for the changed reduction ratio has already been calculated, the image size data of the header and the reduced video signal have equal reduction ratios. Since the flag bit SP has been written, however, for the one-field period just after DP3, as shown at (d) in FIG. 4, the display video clock generator 23 maintains the read enable signal RE at the L level as before and does not read the image size data or the video signal so that the video signal output is again muted, as shown at (f) in FIG. 4. Consequently, the television display of FIG. 3 can continuously display a child frame without displaying distorted data, even when the image reduction ratio data are changed.

The flag bit is written not only for the one-field period just after the change in the reduction ratio but for the two-field period, to ensure that the disadvantageous video signal output is muted without fail even if an address pass condition is caused by writing and reading the field memory. More specifically, FIG. 5 shows what occurs when the read address gets sequentially ahead ("passes", an address pass incident) the write address to which data are being written during the one-field period following DP3, as shown at (d) in FIG. 5 in the course of writing the video signal into the memory during the one-field period just after NP3, as shown at (a) in FIG. 5. In this case, the image size data stored within the header, written during the one-field period just after NP3, correspond to the changed reduction ratio data and were successfully calculated during the preceding one-field period. For the one-field period just after DP3, moreover, the changed reduced video signal, as written subsequently into the header, is read out until the read address passes the write address, so that the image size data and the video signal have equal reduction ratios. No distortion results in the eventually displayed image. When the read address passes the write address, however, the changed reduced video signal is not yet written in the field memory 2 so that it could be possible to read out the reduced image signal, as written before the change, it the flag bit SP, as shown at (b) in FIG. 5, did not control this aspect of the operation. If the flag bit SP were not written in the header for the one-field period just after the NP3, therefore, the image size data and the reduced video signal having unequal reduction ratios are read out to produce a distorted image for the one-field period just after DP3.

In contrast, according to the present embodiment, the flag bit SP is written as the header for the one-field period just after NP3 so that it is read out for the one-field period just after DP3. As discussed above, therefore, the read enable signal RE, as shown at (e) in FIG. 5, is lowered to the L level, and the image size data and the video signal are not read out from the field memory 2, that is, the video signal output is muted. As a result, the image size data and the reduced video signal having unequal reduction ratios are not read out so that the image is not distorted. For the one-field period following DP4, the read address has already passed the write address so that the header and the video signal, as written for the one-field period just after NP3, could safely be read out again. Since the header contains the flag bit SP, however, the video signal output remains muted, as shown at (f) in FIG. 5. For the one-field period just after NP4, on the other hand, the SP has already dropped to the L level so that the flag bit is no longer written into the header. As a result, for periods following DP5, the image size data and the reduced video signal having equal reduction ratios are read out without fail.

In the first embodiment thus far described, the video signal output muting period continues at least for the two-vertical periods of the display V.

Figure 6:
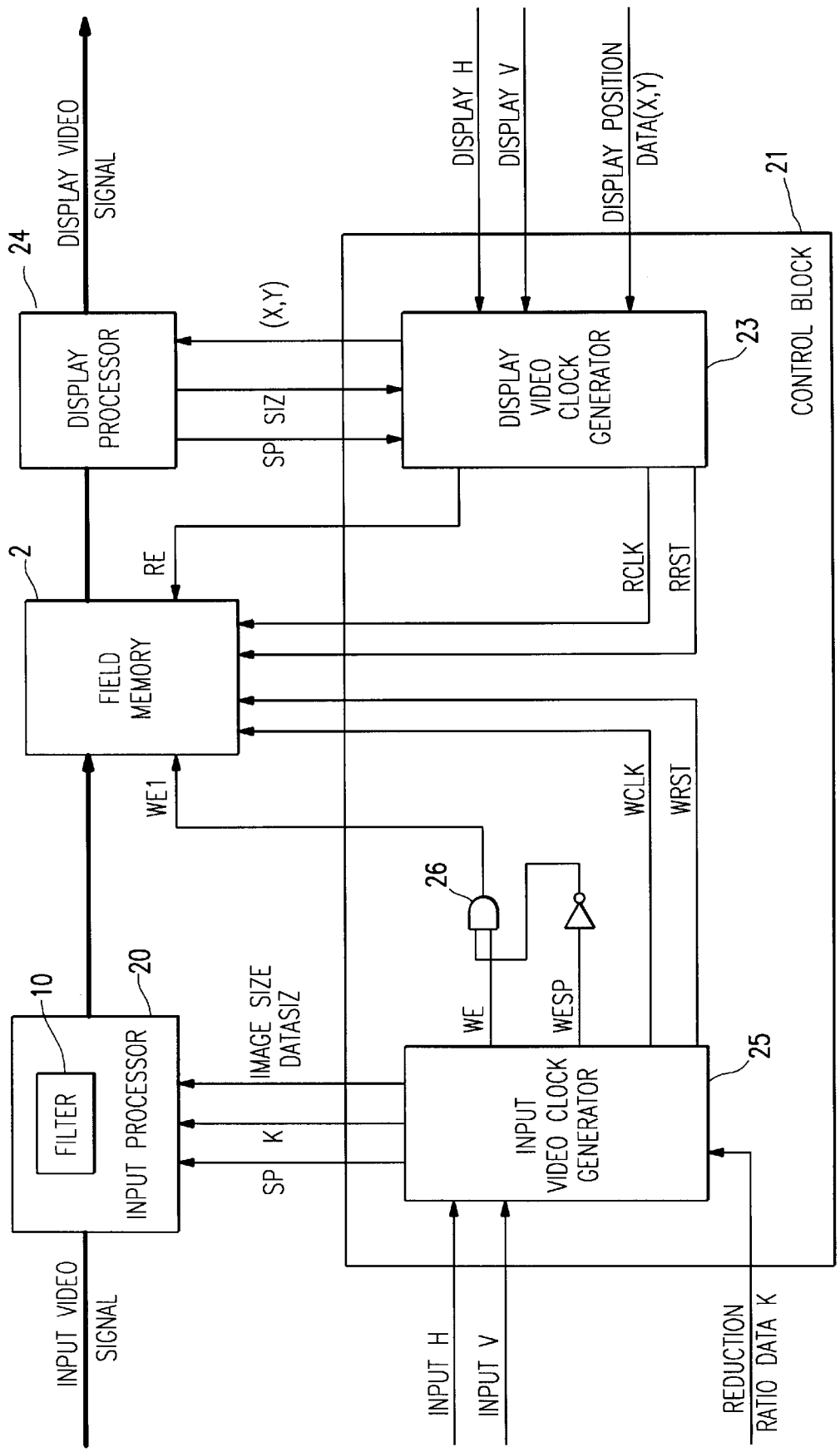
FIG. 6 is a block diagram showing a second embodiment of the invention.

A second embodiment of the present invention which utilizes a shorter muting period is shown in FIG. 6. In this second embodiment, an input video clock generator 25 is constructed to output a write inhibiting signal WESP, as shown at (b) in FIG. 7, only for the one-field period just after the change in the reduction ratio data K. There is further provided an AND gate 26 which receives the inverted output of the write inhibiting signal WESP and the enable signal WE and outputs the enable signal WE1 in response. Consequently, as shown in a timing chart of FIG. 7, the enable signal WE1, as shown at (d) in FIG. 7, is not outputted and the header and the video signals are not written in the field memory for the one-field period just after NP2, as shown at (a) in FIG. 7, of the change in the reduction ratio. As a result, for the one-field period preceding DP2, as shown at (e) in FIG. 7, there are read out the header and the video signal which are written for the one-field period just before NP2. Since the header stored in the memory contains no flag bit at this time, the image size data and the video signal are read out so that the video signal output is not muted. Moreover, both the image size data and the video signal, as read out at this time, are those before the change in the reduction ratio so that the display is not distorted.

For the one-field period following the next vertical blanking interval NP3, the write inhibiting signal WESP is maintained at the L level, and the SP, as shown at (c) in FIG. 7, is held at the H level so that the flag bit is written to the header as in the first embodiment. For the one-field period just after DP3, therefore, the flag bit is read out, and the read enable signal RE, as shown at (f) in FIG. 7, drops so that the video signal output is muted, as shown at (g) in FIG. 7. For the one-field period just after NP4, the SP has already dropped to the L level so that the flag bit is not written as the header. As a result, during and after the vertical blanking interval NP4, the image size data and the reduced video signal generated in accordance with equal reduction ratios are read out without fail. Thus in the case shown in FIG. 7, the muting period is the one-field period which is shorter than the two-field period shown in FIG. 4.

Next, the case is described, with reference to a timing chart of FIG. 8, in which an address pass incident occurs when writing and reading the field memory. FIG. 8 illustrates various signals of interest for the case in which the read address passes the write address during the one-field period just after DP3, as shown at (e) in FIG. 8, during the writing time following the one-field period just after NP3, as shown at (a) in FIG. 8, similar to the situation shown in FIG. 5. In this case, for the one-field period just after NP2 of the change in the reduction ratio as in FIG. 7, the write inhibiting signal WESP takes the H level. As a result, the enable signal WE1 is not output and the header and the video signal are not written to the field memory 2, as shown at (d) in FIG. 8. For the one-field period just after DP2, therefore, the image size data and the video signal, as written for the one-field period just before NP2 but not yet changed, are read out, but the video signal output is not muted. Moreover, no distortion occurs in the display.

For the one-field period just after NP3, the write inhibiting signal WESP, as shown at (b) in FIG. 8, has already dropped to the L level, and the SP, as shown at (c) in FIG. 8, is at the H level so that the flag bit is written to the header as in the first embodiment. For the one-field period just after DP3, therefore, the flag bit is read out, and the read enable signal RE, as shown at (f) in FIG. 8, is at a low value L so that the video signal output is muted. In other words, the video output is muted for that time interval in which an address pass occurs that causes the image size data and the video signal to have characteristics of different reduction ratios. For the one-field period just after DP4, moreover, the read address has already been passed by the write address so that the header and the video signal, as written for the one-field period just after NP3, are read out again. Since this header contains the flag bit SP, the video signal output is likewise muted, as shown at (g) in FIG. 8. For the one-field period just after NP4, the SP has already dropped to the L level so that the flag bit is not written in the header. As a result, during and after the interval DP5, the image size data and the reduced image signal generated in accordance with equal reduction ratios are read out without fail. In this case, moreover, the muting period spans the two-field period, which is shorter by one-field period than that for the embodiment of FIG. 5.

As has been described hereinbefore, if the image size data and the reduced video signal are not coincident, the video signal output can be reliably muted to output only the video signal for equalizing the reduction ratio between the image size data and the reduced video signal. Here, since the write and read data are supplemented by the header data, the write and read enable signals WE, WE1 and RE are raised accordingly earlier than those of the prior art, as indicated by dotted lines in FIG. 4.

Here in the aforementioned first and second embodiments, the read enable signal RE from the display video clock generator 23 is set to the L level when no video signal is to be read from the field memory 2 so that the muting of the video signal output is realized. However, the reading of the video signal may be performed to mute the output in the downstream display processor 24 with similar effect and advantage.

The description thus far made is directed to the process for reducing the image, but the invention could likewise be applied to a process for magnifying or enlarging the image. In the claims below which define the present invention, the terms "magnifying" or "magnification" refer to either the reduction or the enlargement of an image. This use is consistent with the general notion used in some branches of optics to refer to both reduction and enlargement as being a magnification.

According to the invention, the change in the image magnification can be reliably coped with even if it is done anytime, so that the image magnification can be changed while leaving the reduced or enlarged image still displayed in the window. If the image size data and the video signal are not coincident when the image magnification data are changed, the video signal output is most preferably muted so that only the video signal having an image magnification equal to that of the image size data is output at all times.

By executing the write inhibition processing, moreover, the muting period of the video signal output can be shortened.

What is claimed:
1. A video signal processing circuit comprising:
an input processor for reducing or enlarging an input video signal in accordance with image magnification data;
a buffer memory for storing the reduced or enlarged video signal; and
a write control unit for controlling writing to the buffer memory by generating a write control signal in accordance with the image magnification data, the write control unit including:
a calculation circuit for calculating image size data after a change in the image magnification data, and a display control unit for writing the calculated image size data as a header together with the reduced or enlarged video signal in the buffer memory, the display control unit writing a flag bit indicating the change in the image magnification data in the header for a predetermined period after the change in the image magnification data, the display control unit controlling reading of video signals from the buffer memory in accordance with the image size data, and for muting a video output for a constant period of time after detecting the flag bit.

2. A video signal processing circuit according to claim 1, wherein the calculation circuit is responsive to the write control signal and calculates the image size data by counting cycles of the write control signal.

3. A video signal processing circuit according to claim 1, wherein the predetermined period is two vertical periods whereas the constant period is one vertical period.

4. A video signal processing circuit according to claim 1, wherein the write control unit further includes an inhibition circuit for inhibiting writing to the buffer memory at least for a calculation period in the calculation circuit.

5. A video signal processing circuit according to claim 4, wherein the predetermined period is two vertical periods whereas the constant period is one vertical period.

6. A video signal processing circuit comprising:

an input processor for reducing or enlarging an input video signal in accordance with image magnification data;

a buffer memory for storing a reduced or enlarged video signal; and a write control unit for controlling writing to the buffer memory by generating a write control signal in accordance with the image magnification data, the write control unit including:

a calculation circuit for calculating image size data after a change in the image magnification data, and a display control unit for writing a header to the buffer memory representative of the image magnification data, wherein the header includes a flag to indicate whether the change in the image magnification data has occurred, wherein the flag causes the display control unit to prevent output of a video signal when at least one display condition is consistent with a value of the image magnification data before the change in the image magnification data.

7. A video signal processing circuit according to claim 6, wherein the display control unit prevents output of the video signal when at least one header data value is consistent with a value of the image magnification data after the change.

8. A video signal processing circuit according to claim 6, wherein the header also contains the calculated image size data.

9. A video signal processing circuit according to claim 8, wherein the calculated image size data are present in the header when the reduced or enlarged video signal is stored in the buffer memory.

10. A video signal processing circuit according to claim 6, wherein the calculation circuit is responsive to the write control signal and calculates the image size data by counting cycles of the write control signal.

11. A video signal processing unit according to claim 6, wherein the flag within the header is a flag bit having one value indicating a change in the image magnification data and wherein the flag bit is maintained at the one value for a predetermined period after the change in the image magnification data.

12. A video signal processing unit according to claim 11, wherein the display control unit prevents output of a video signal by preventing reading of video signals from the buffer memory.

13. A video signal processing unit according to claim 12, wherein output of the video signal is triggered by the display control unit detecting the flag bit and wherein output of the video signal is prevented for a constant period of time after detecting the flag bit.

14. A video signal processing circuit according to claim 13, wherein the predetermined period is two vertical periods whereas the constant period is one vertical period.

15. A video signal processing unit according to claim 6, wherein the display control unit prevents output of a video signal by preventing reading of video signals from the buffer memory.

16. A video signal processing circuit according to claim 6, wherein the write control unit further includes an inhibition circuit for inhibiting writing to the buffer memory at least for a calculation period of the calculation circuit.

\* \* \* \* \*